United States Patent [19]
Derwin et al.

[11] Patent Number: 5,305,277
[45] Date of Patent: Apr. 19, 1994

[54] DATA PROCESSING APPARATUS HAVING ADDRESS DECODER SUPPORTING WIDE RANGE OF OPERATIONAL FREQUENCIES

[75] Inventors: Michael T. Derwin, Delray Beach; Brenda M. Ozaki, Deerfield Beach; William A. Wall, Boca Raton, all of Fla.

[73] Assignee: International Business Machines Corporation, Armonk, N.Y.

[21] Appl. No.: 690,738

[22] Filed: Apr. 24, 1991

[51] Int. Cl.[5] .............................................. G11C 7/00
[52] U.S. Cl. ........................ 365/230.02; 365/230.06; 365/230.08; 307/463
[58] Field of Search ............... 365/230.2, 230.6, 230.8; 307/463

[56] References Cited

U.S. PATENT DOCUMENTS

| | | | |
|---|---|---|---|
| 4,750,839 | 6/1988 | Wang et al. | 365/233 |
| 4,766,572 | 8/1988 | Kobayashi | 365/189.05 |
| 4,897,819 | 1/1990 | Takizawa | 365/230.06 |
| 4,970,692 | 11/1990 | Ali et al. | 365/230.02 |
| 5,005,157 | 4/1991 | Catlin | 365/230.02 |
| 5,148,535 | 9/1992 | Ballard | 365/230.08 |

*Primary Examiner*—John S. Heyman
*Attorney, Agent, or Firm*—Bernard D. Bogdon

[57] ABSTRACT

An address decoder is connected to an address bus and comprises a plurality of latches for latching address signals from the address bus. Decode logic is connected to use unlatched addresses from the address bus or latched addresses from the latches. The decoder is selectively operable to decode addresses in two modes, an unlatched mode and a latched mode dependent upon system frequency. The decode logic produces a signal that is transmitted into a state machine for controlling operation thereof.

7 Claims, 4 Drawing Sheets

DATA PROCESSING APPARATUS HAVING ADDRESS DECODER SUPPORTING WIDE RANGE OF OPERATIONAL FREQUENCIES

FIELD OF THE INVENTION

This invention relates to the field of data processing, and, more particularly, to an improved address decoder having latched and unlatched modes of address decoding to support system operation over a wide range of system operating frequencies.

BACKGROUND OF THE INVENTION

In a data processing system having a synchronous bus, memory and I/O addresses are transmitted over the bus during clocked bus cycles. There is a time delay between the start of a bus cycle and when address signals being placed on the bus become valid, which is known as the "address delay time". Logic which interfaces to a synchronous bus usually performs an address decode in one of two ways. The address signals from the bus are either decoded directly without being latched or such signals are first latched by the receiving device and then decoded. The choice of implementation is driven by factors such as frequency of operation and address delay time. Direct unlatched decoding is often chosen since unlatched decoded addresses are available earlier than latched decoded addresses. However, if the decoded addresses are fed to other synchronous logic, e.g., a state machine, the decoding time must be less than the time of the clock period minus the address delay time. If the addresses are first latched before being fed to other clocked logic, the address decoding time is extended by one full clock period. A decoder is comprised of combinational logic, and the decoder path delay is determined by the technology and the number of levels of logic. Since decoding time is often a critical timing parameter and may be quite complex, the unlatched method of address decode limits the operational frequency of the logic.

In the known prior art, an address decoder was designed to operate in only one way dependent upon its technology and system operational frequency. While latched decoding could be used for both slow and fast systems, its use in a slow system might degrade performance. On the other hand, unlatched decoding is faster in slow systems but cannot be used in fast systems. The invention is designed to overcome such limitations of the prior art by providing an address decoder operable to decode addresses selectively in either one of two modes, latched or unlatched, and thereby allow the decoder to be used in an optimal fashion over a wide range of operational frequencies.

The closest known patents are U.S. Pat. Nos. 4,750,839-Wang et al and 4,766,572-Kobayashi. U.S. Pat. No. 4,750,839 is entitled a "SEMICONDUCTOR MEMORY WITH STATIC COLUMN DECODE AND PAGE MODE ADDRESSING CAPABILITY", and discloses circuitry for either latching a column address before it is decoded or transmitting an unlatched column address directly to a decoder. Selection of whether the address is to be latched is not dependent on operational speed but upon the order in which a row address strobe and a column address strobe are received. U.S. Pat. No. 4,766,572 is entitled a "SEMICONDUCTOR MEMORY HAVING A BYPASSABLE DATA OUTPUT LATCH". Such latch is selectively settable to determined whether the data read from memory is latched or not. Such teaching does not deal with decoding addresses.

SUMMARY OF THE INVENTION

One of the objects of the invention is to provide an improved address decoder having an expanded operational frequency range so that the decoder can be used in a data processing system with microprocessors which operate at different system frequencies.

Another object of the invention is to provide an improved address decoder operational across a wide range of system frequencies to selectively decode latched and unlatched addresses.

Yet another object of the invention is to provide an improved decoder that operates in an unlatched address decoding mode at lower system frequencies and in a latched address decoding mode at higher system frequencies thereby allowing an optimal decode method to be used at both low and high frequencies.

Still another object of the invention is to provide an improved address decoder that is operable in either one of two modes, an unlatched mode and a latched mode, dependent upon the system frequency.

A further object of an alternate embodiment of the invention is to provide an improved address decoder in which a latched mode or an unlatched mode of operation is either programmed or automatically selected in accordance with the system operating frequency.

Briefly, in accordance with the invention, an address decoder is connected between an address bus and a device that is being addressed. The decoder comprises latches for latching addresses from the address bus. A decoder is connected to the address bus and to the latches, the decoder being selectively operable in an unlatched mode or a latched mode.

DRAWINGS

Other objects and advantages of the invention will be apparent from the following description taken in connection with the accompanying drawings wherein.

DETAILED DESCRIPTION

Figure 1:
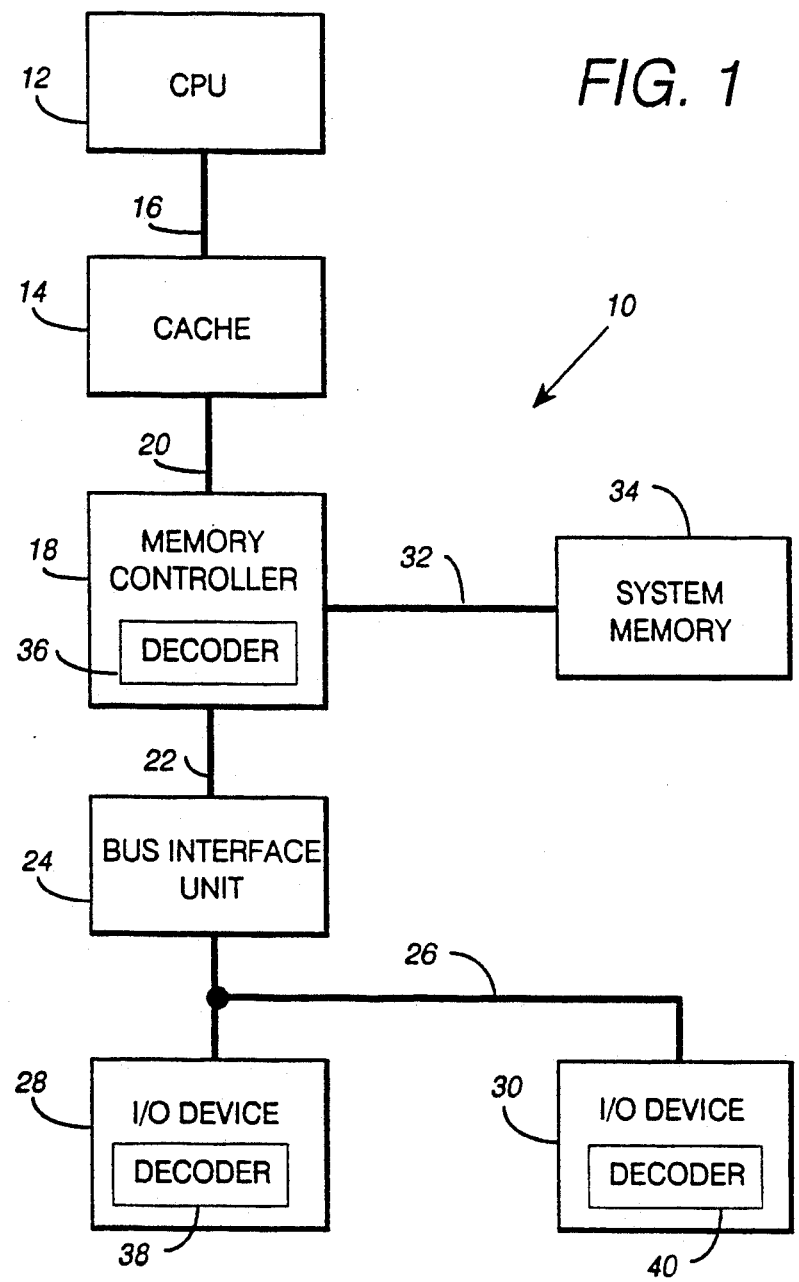
FIG. 1 is a block diagram of a data processing system, which illustrates a preferred embodiment of the invention.

Referring now to the drawings, and first to FIG. 1, a data processing system 10 comprises a central processing unit (CPU) 12 connected to a cache 14 by a bus 16. The CPU is preferably part of a microprocessor such as an Intel 80486 microprocessor. Cache 14 may be an internal 80486 cache or a cache external to the microprocessor. The system operating frequency is determined by the nominal speed of the microprocessor or CPU which, for an 80486 microprocessor, is currently in the range of 25-33 Mhz. A dual port memory controller 18 has one port connected to bus 22 and another port connected to a bus 20. Bus 22 in turn is connected to a bus interface unit (BIU) 24 that is further connected to an I/O or expansion bus 26 constructed in accordance with Micro Channel architecture. Bus 26 has a plurality of I/O devices 28 and 30 connected to it. Controller 18 is connected to a memory bus 32 which is further connected to a system memory 34. Controller 18 and I/O devices 28 and 30 respectively include decoders 36, 38, and 40. The various busses operate synchronously and include conventional address, data, and control lines or busses conforming to the architecture of the microprocessor.

The novelty in the invention resides in details of the decoders and their interaction with other elements of system 10. It is obvious to those skilled in the art that a data processing system typically includes many items the details of which are not germane to the invention. Those portions of system 10 other than the novel decoders described in detail below, comprise commercially available data processing devices and only so much of the details and operation thereof as may be necessary for an understanding of the invention, are described herein.

Figure 2:
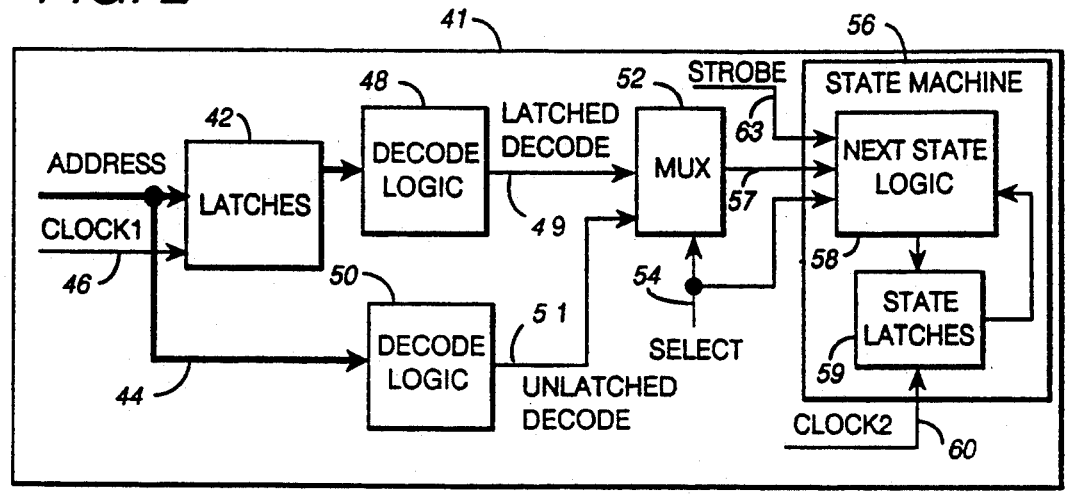
FIG. 2 is a is a block diagram of a decoder shown in FIG. 1.

Decoders 36, 38, and 40 are similar so that only one need be described in detail. With reference to FIG. 2, each decoder is designed to be fabricated on a chip 41 that would be a memory controller chip or an I/O chip as the case may be. The chip is also designed to support system operating frequencies over a wide range from 25 Mhz to 50 MHz. Such range encompasses system frequencies currently commercially available as well as higher frequencies likely to be commercially available in the future. The decoder comprises a plurality of latches 42 for temporarily storing the address signals. Latches 42 have two inputs 44 and 46 respectively connected to receive ADDRESS signals from the address bus and a CLOCK1 signal that is a single pulse signal derived from an address status signal sent by the CPU. When active or valid ADDRESS signals are present on input 44 and in response to a rising edge of CLOCK1, such addresses are clocked into and latched up in latches 42 so as to provide a latched address output therefrom which is fed into address decode logic 48. Line 44 is also connected directly to decode logic 50 that is the same as logic 48 except that it receives unlatched address signals.

During operation of system 10, CPU 12 transmits both physical memory addresses and I/O port addresses over the address bus. Each decoder receives all such addresses. The function of decode logic 48 and 50 is to analyze the addresses received thereby and, after a short circuit delay, output a DECODE signal indicating whether the received address is within the range of addresses of the device with which the decoder is associated. Logic 48 produces a LATCHED DECODE signal when the address latched in latches 42 is within the range of the decoder, and logic 50 produces an UNLATCHED DECODE signal when the address on lines 44 is directed to the associated device. The outputs of logic 48 and logic 50 are respectively single lines 49 and 51 that are connected to inputs of a multiplexer (MUX) 52 and respectively transmit to the MUX the LATCHED DECODE signal and the UNLATCHED DECODE signal. The DECODE signal enables the associated device so that it can perform the desired access. If the input address is not directed to the associated device, a DECODE signal is not produced.

MUX 52 has an input control line 54 connected to receive a SELECT signal which controls the mode of operation. In response to such control signal, MUX 52 outputs on line 57 either an UNLATCHED DECODE signal from logic 50 or a LATCHED DECODE signal from logic 48 dependent on whether SELECT is active or inactive (1 or 0). Line 57 is connected to an input of next state logic 58 in a state machine 56. Logic 58 also receives as inputs a STROBE signal on line 63 and the SELECT signal on line 54. The STROBE signal is derived from the address status signal on the address bus which arrives synchronously with ADDRESS signals on line 44. The STROBE signal enables the next state logic as described hereinafter. Logic 58 is also connected to a plurality of state latches 59 and transmits to latches 59 NEXT STATE signals (FIG. 7) for controlling the settings of such latches. Logic 58 also receives signals from the latches representing the state thereof to be used in analyzing the current state and which state will be next switched to. A CLOCK2 signal is received on input line 60 and is inputted into state latches 59 so that other inputs into the latches are latched up on the falling edge of the CLOCK2 signal. Next state logic 58 interacts with the settings of state latches 59 to control the sequence of events that occur in response to changes in the input conditions. The operation of the state machine is further described hereinafter.

The SELECT signal on line 54 controls the mode of address decoding, the modes being an unlatched mode and a latched mode. Line 54 may be manually programmed to select the proper mode by connecting line 54 to a pinout on chip 41, the pinout being further connected off chip to a voltage level representing either an active signal or an inactive signal. The mode is dependent on the system frequency and the breakdown frequency of decoder operation. Thus, assuming the breakdown frequency to be 35 MHz, the SELECT signal should be inactive when the system frequency is below 35 MHz so that the decoder works in the unlatched mode. When the system frequency is equal to or above 35 MHz, SELECT should be active whereby the decoder works in the latched mode.

Figure 3:
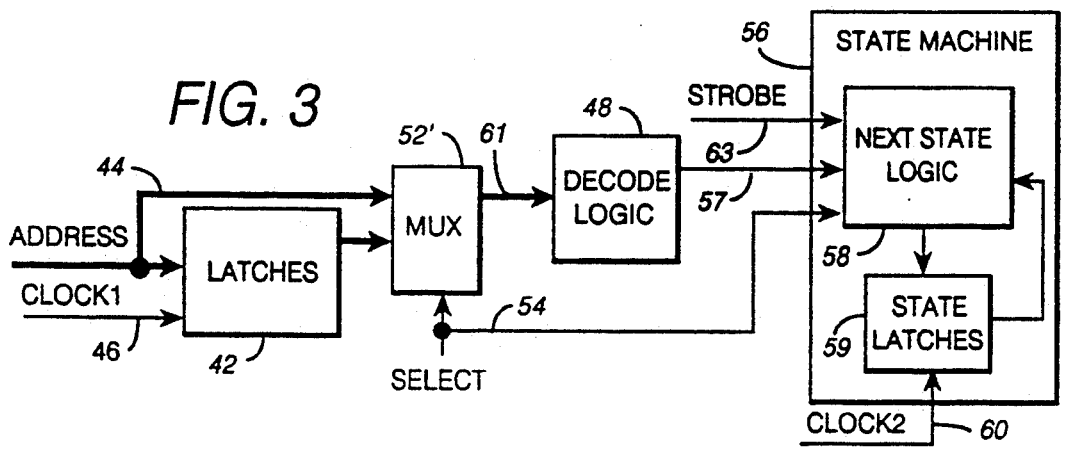
FIG. 3 is a block diagram of an alternate form of decoder.

FIG. 3 illustrates a slightly different decoder which uses a single decode logic 48. A MUX 52' receives unlatched addresses on line 44 and latched addresses from latches 42. MUX 52' is controlled by a SELECT signal on line 54 whereby MUX 52' transmits on line 61 into decode logic 48 either latched addresses or unlatched addresses dependent on the value of the SELECT signal. The decode logic 48 then produces a DECODE signal that is LATCHED or UNLATCHED dependent on the mode. The net effect of the decoding in each of the embodiments shown in FIGS. 2 and 3, is to receive both latched and unlatched address signals and generate a decode signal, when the address is that of the associated state machine, which is derived from one sets of address signals, the decode signal being a function of the mode of operation.

Figure 4:
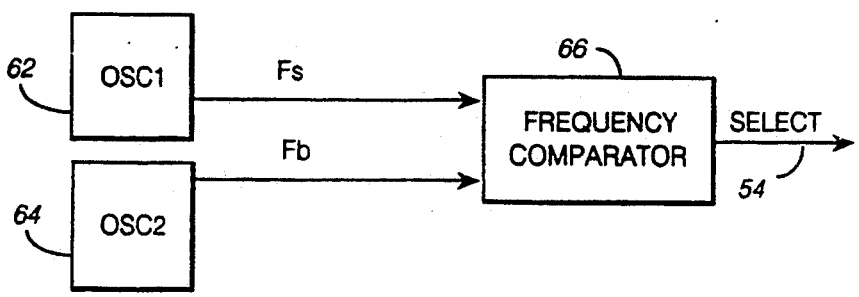
FIG. 4 is a block diagram of an alternate embodiment of decoder mode selection.

FIG. 4 shows an alternate embodiment for generating the proper SELECT signal automatically dependent upon system frequency. A first oscillator OSC1 produces system frequency Fs. A second oscillator OSC2 produces a breakdown frequency Fb. Both signals are fed to a frequency comparator 66 which produces an active SELECT signal when Fs<Fb and an inactive SELECT signal when Fs=>Fb. Thus, the embodiment shown in FIG. 4 automatically determines the mode as a function of system frequency, whereas the embodiment of FIG. 3 requires that the system designer makes the decision as to the mode to be used in view of knowledge of the value of the breakdown frequency relative to the system frequency.

Figure 5:
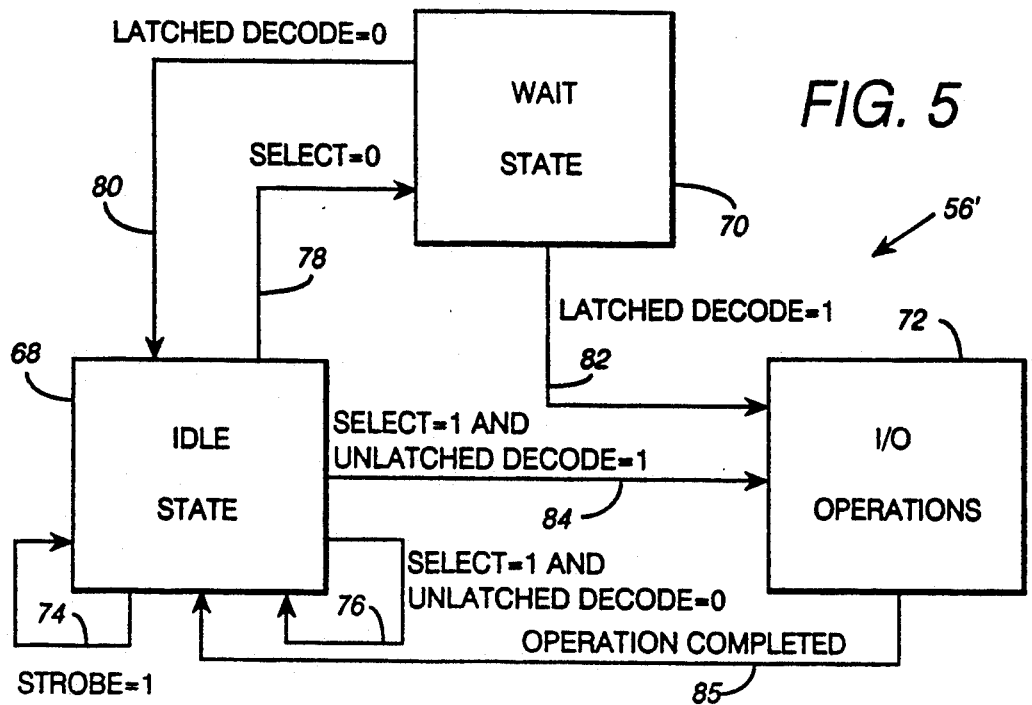
FIG. 5 is a logical diagram of an I/O state machine.

FIG. 5 illustrates the logic of an I/O state machine 56' for I/O devices, such machine having a plurality of states including an idle state 68, a wait state 70, and an I/O operations state 72. An active STROBE or STROBE=0 signal occurs in conjunction with active ADDRESS signals. Prior to the start of an I/O operation, STROBE is inactive or=1, and machine 56' cycles in the idle state 68 along path 74 until the STROBE signal goes active. When STROBE goes active, the next event is determined by the mode control signal, SELECT. If SELECT=1, machine 56' follows path 76 and remains in an idle state so long as UNLATCHED DECODE=0. When UNLATCHED DECODE=1, the machine is switched along path 84 from idle state 68 to I/O operations 72. If SELECT=0 when STROBE goes active, path 78 is followed to switch from the idle state to wait state 70. Then, machine 56' returns to the idle state along path 80 if the LATCHED DECODE signal is inactive. If the LATCHED DECODE signal goes active, machine 56' switches along path 82 to the I/O operations state. Machine 56' performs whatever I/O operation is required, e.g., a read or a write operation, dependent on other control signals (not shown) which are conventionally used to control the I/O device being accessed. Upon completion of the specific I/O operation or function, the machine returns via path 85 to the idle state. During the course of performing the I/O operation, the STROBE signal goes inactive so that when the machine returns to the idle state, it remains there via loop 74 until the next active STROBE signal is received.

In summary, the operation of state machine 56' begins with the idle state 68 where it remains until the STROBE signal goes active. When such signal goes active (upon ADDRESS signals being placed on the address bus), the next state is determined by the mode selection signal, SELECT. If SELECT is active, the machine goes directly to the I/O operation state 72 when the LATCHED DECODE signal goes active. Otherwise, when SELECT is inactive, the machine switches to the wait state. Then, if the LATCHED DECODE signal goes active, the machine starts an I/O operation.

Figure 6:
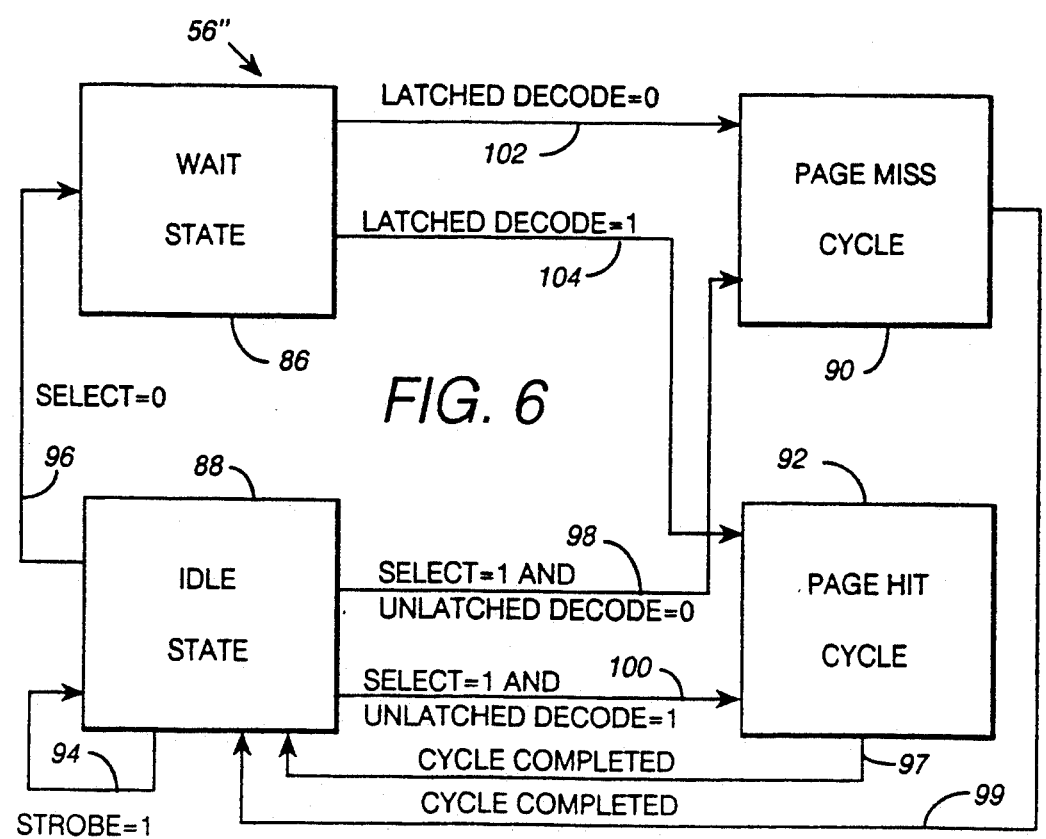
FIG. 6 is a logical diagram of a memory controller state machine.

FIG. 6 shows a memory controller state machine 56" representing how decoder 36 operates in controller 18. Such state machine has a plurality of states including an idle state 88, a wait state 86, a page hit cycle 92 and a page miss cycle 90. When STROBE=1, machine 56" follows path 94 and remains in the idle state. When the strobe goes active, if SELECT=0, machine 56" switches on path 96 to wait state 86 and then on either path 102 or 104 to the page hit or miss cycles 90 or 92 dependent on the status of the LATCHED DECODE signal. Otherwise, if SELECT=1 when the STROBE goes active, either path 98 or path 100 is traversed dependent on the status of the UNLATCHED DECODE signal. Upon completion of the page hit and miss cycles, machine 56" switches back to idle state 88 via paths 97 and 99.

Figure 7:
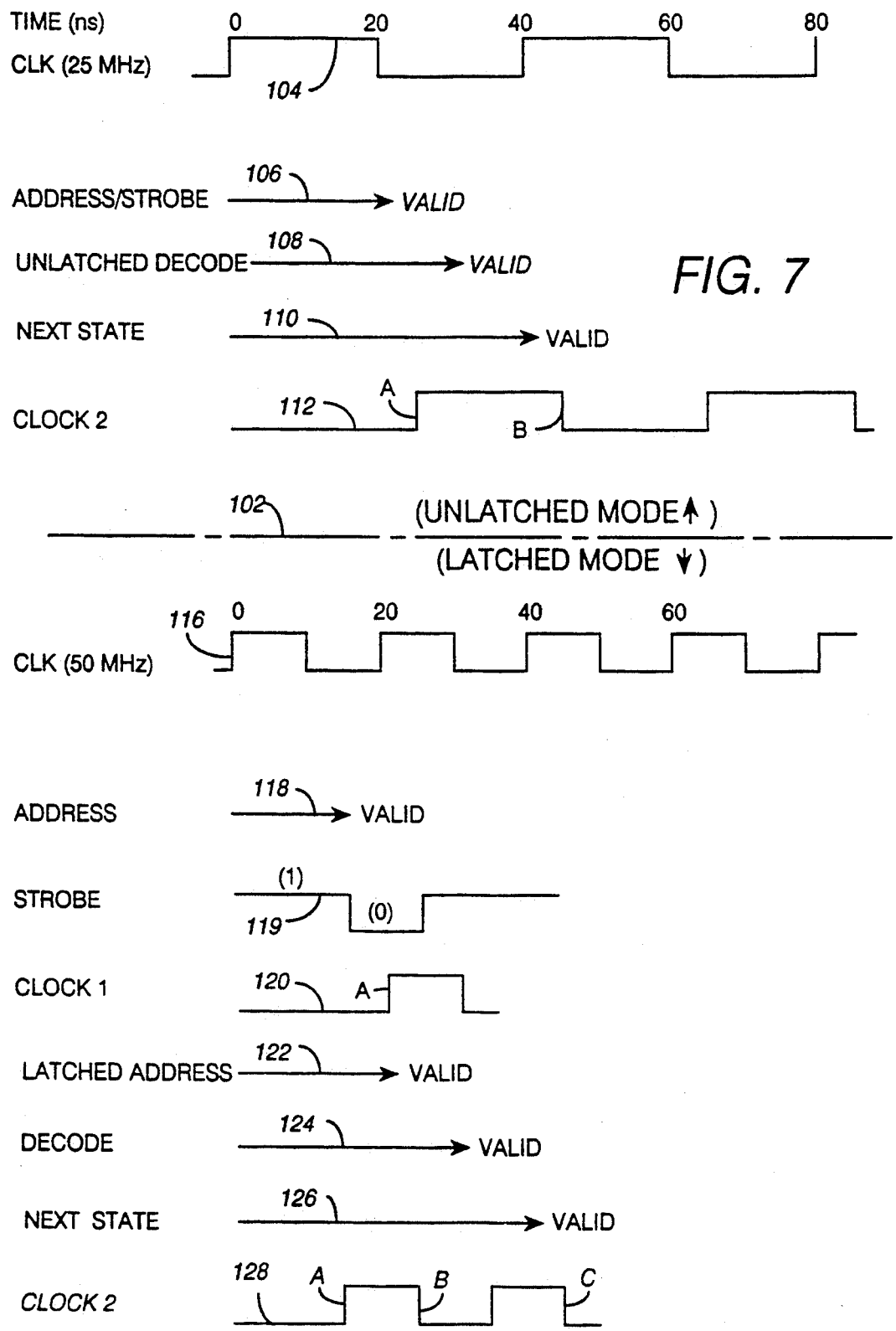
FIG. 7 is a timing diagram illustrating latched and unlatched modes of operation.

FIG. 7 illustrates timing signals that occur when operating the decoder shown in FIG. 2 at exemplary system frequencies of 25 MHz and 50 MHz and using exemplary circuit delay times set forth hereinafter. A lower frequency, unlatched operation is shown above line 102 and a higher frequency, latched operation is shown below line 102. Clock signal 104 occurs at a 25 MHz frequency and has a period of 40 ns (nanoseconds). ADDRESS/STROBE signals 106 are placed on the address bus control lines in synchronism with clock 104 and become valid 22 ns into a bus cycle. The period between when the address signals are first placed on the address bus and when they become valid is "address delay time". Assuming decode logic 50 has a decode path delay time of 10 ns, a valid DECODE signal 108 from logic 50 is generated at 32 ns and valid NEXT STATE signals 110 appear at 42 ns. Such 10 ns difference represents the time during which the decode signal is analyzed and the NEXT STATE signals are generated in the state machine and become valid. Subsequently, falling edge B of CLOCK2 signal 112 latches such signals into the state latches where they then represent the current state.

CLOCK2 signal 112 is driven off clock 104 and at the same frequency but is inverted and delayed relative thereto. CLOCK2 includes a pulse that has a rising edge A at 25 ns and a falling edge B at 45 ns, at which time valid NEXT STATE signals 110 are latched up in state latches 59. There is thus a 3 ns "slack" period between when NEXT STATE becomes valid and when they are latched up by the falling edge B of CLOCK2 and the state machine then operates in accordance with the desired access. If the system clock frequency is at a rate above the breakdown frequency, the falling edge B of signal 112 would occur before the NEXT STATE signals become valid, which would cause an error. It is thus seen that the address time delay and the decoding circuit delay are relatively short compared to the clock period so that the DECODE signal is generated within the first clock period of the bus cycle, which begins at time 0 of clock 104.

During the illustrated latched mode of operation, clock signal 116 has a rate of 50 MHz and a period of 20 ns. ADDRESS signals 118 are valid at 16 ns of the first clock period and the ADDRESS signals on input 44 (FIG. 2) are latched in latches 48 at 21 ns in the second clock period by the rising edge A of CLOCK1 signal 120 to then provide a valid LATCHED ADDRESS signals 122. CLOCK1 is driven off of STROBE signal 119 and is inverted and delayed slightly relatively thereto. A decode path delay time of 10 ns causes DECODE signal 124 to be valid at 31 ns in the second clock period, followed by another circuit delay of 10 ns before NEXT STATE signals 126 go valid at 41 ns. The CLOCK2 signal 128 includes a second pulse having a falling edge C which occurs at 45 ns in the third clock period, causing the NEXT STATE signals to be latched into state machine 56 thereby causing the access operation to be executed. CLOCK2 128 also includes a first pulse having a falling edge B which occurs at 25 ns. At such point, the SELECT signal determines the next state and causes the state machine to transition into the wait state.

It should be apparent to those skilled in the art that many changes can be made in the details and arrangements of steps and parts without departing from the scope of the invention as defined in the appended claims.

What is claimed is:

1. A data processing system operable at a predetermined system frequency including an addressable device, an address bus for transmitting address signals to said device, and a decoder connected between said address bus and said device for decoding unlatched address signals directed to said addressable device, said decoder comprising:

latch means having first inputs connected to receive unlatched address signals from said address bus and a second input for receiving a clock signal for latching addresses on said first inputs into said latch means, said latch means outputting latched address signals;

decoding means comprising first and second decode logic circuits, said first decode logic circuit having an input connected to received unlatched address signals from said address bus and produce an unlatched decode signal, said second decode logic circuit being connected to receive latched address signals from said latch means and produce a latched decode signal;

a multiplexer connected to receive said decode signals from said decode logic circuits, said multiplexer receiving a binary control input where said decoder is selectively operable in a latched mode of operation and in an unlatched mode of operation; and control means connected to said multiplexer generating said binary control input selectively settable to two values, one value causing said decoding means to produce an unlatched decode signal based on said unlatched address signals when said system frequency is below a predetermined frequency, and another value causing said decoding means to produce a latched decode signal based on said latched address signals when said system frequency is above said predetermined frequency.

2. A data processing system operable at a predetermined system frequency including an addressable device, an address bus for transmitting address signals to said device, and a decoder connected between said address bus and said device for decoding unlatched address signals directed to said addressable device, said decoder comprising;

latch means having first inputs connected to receive unlatched address signals from said address bus and a second input for receiving a clock signal for latching addresses on said first inputs into said latch means, said latch means outputting latched address signals;

decoding means connected to said address bus and to said latch means for receiving both said latched address signals from said latch means and said unlatched address signals from said address bus and producing a decode signal derived from said unlatched address signal in said unlatched mode and from said latched address signal in said latched mode where said decoder is selectively operable in a latched mode of operation and in an unlatched mode of operation; and control means connected to said decoding means generating and comprising a binary control input set automatically in accordance with said system frequency selectively settable to two values, one value causing said decoding means to produce an unlatched decode signal based on said unlatched address signals when said system frequency is below a predetermined frequency, and another value causing said decoding means to produce a latched decode signal based on said latched address signals when said system frequency is above said predetermined frequency.

3. A data processing system in accordance with claim 2 comprising:

a comparator for comparing said system frequency with a predetermined breakdown frequency and setting said binary control input in accordance with such comparison.

4. A data processing system operable at a predetermined system frequency including an addressable device, an address bus for transmitting address signals to said device, and a decoder connected between said address bus and said device for decoding unlatched address signals directed to said addressable device, said decoder comprising:

latch means having first inputs connected to receive unlatched address signals from said address bus and a second input for receiving a clock signal for latching addresses on said first inputs into said latch means, said latch means outputting latched address signals;

decoding means connected to said address bus and to said latch means for receiving both said latched address signals from said latch means and said unlatched address signals from said address bus and producing a decode signal derived from said unlatched address signal in said unlatched mode and from said latched address signal in said latched mode where said decoder is selectively operable in a latched mode of operation and in an unlatched mode of operation; and selectively actuated mode control means for operating said decoder in one of said modes of operation so as to allow said decoder to be operated in said unlatched mode when said system frequency is below a predetermined value and in said latched mode when said system frequency is above said predetermined value.

5. A data processing system operable at a predetermined system frequency, including a system clock signal operable at a predetermined frequency, an addressable state machine, an address bus for transmitting address signals to access said state machine in synchronism with said system clock signal and a decoder connected between said address bus and said state machine for decoding unlatched address signals directed to said addressable state machine, comprising:

a plurality of latches within the decoder connected to said address bus for temporarily storing address signals therein in synchronism with the operation of said bus and said state machine;

decoding means connected to said address bus and to said latches for producing a decode signal when said address signals are directed to said state machine, said decoding means being selectively operable in a latched mode of operation and in an unlatched mode of operation whereby said decode signal is derived from said address signals stored in said latches in said latched mode of operation and from address signals on said bus when in said unlatched mode of operation;

control means responsive to a SELECT signal to operate said decoding means in one of said modes; and the state machine having an idle state, a wait state, and an operations state during which said state machine performs an operation for which said state machine is being accessed, said state machine being operable in response to a STROBE signal and to said decode signal to switch from said idle state to said operations state when in said unlatched mode of operation and to switch from said idle state to said wait state and then to said operations state when in said latched mode of operation.

6. A data processing system in accordance with claim 5 wherein:

said decoding means has a circuit delay time sufficiently short relative to said system frequency so as to allow said decode signal to be generated within one system clock period so as to allow said state machine to be switched into said operations state in a clock period immediately following said one period, when in said unlatched mode of operation.

7. A data processing system in accordance with claim 5 wherein:

said decoding means has a circuit delay time relatively long relative to said system frequency whereby said state machine is switched from idle state to said wait state in a first clock period, said decode signal is generated within a second clock period following said first clock period so as to allow said state machine to be switched into said operations state in a third clock period immediately following said second period, when in said latched mode of operation.

* * * * *